J. C. NEWMAN.
CASK FAUCET GAGE.
APPLICATION FILED NOV. 23, 1908.
977,216.
Patented Nov. 29, 1910.
2 SHEETS—SHEET 2.
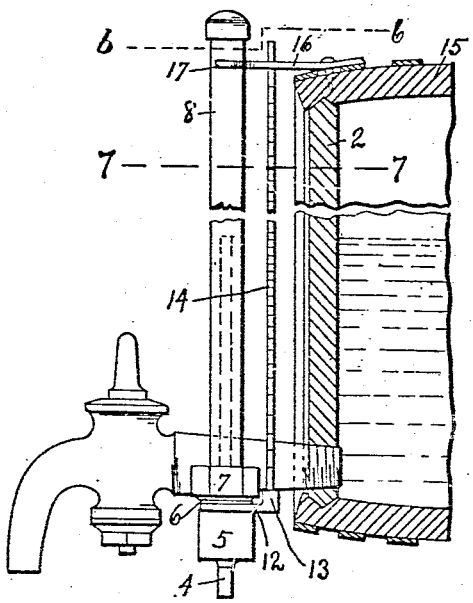
Fig. 5.
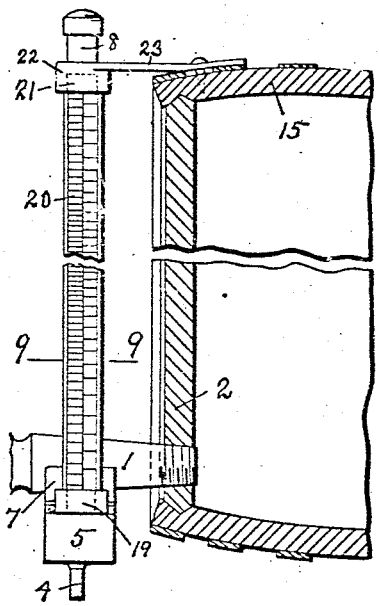
Fig. 8.
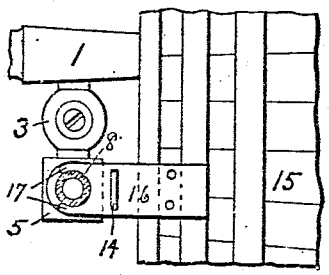
Fig. 6.
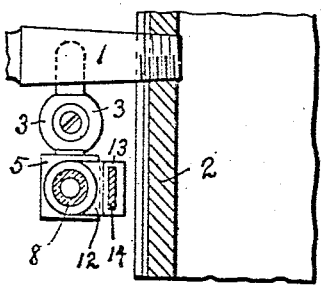
Fig. 7.
Fig. 9.
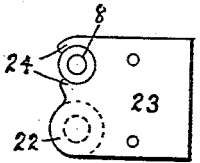
Fig. 10.
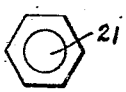
Fig. 11.
Fig. 12.
Fig. 13.
Witnesses
O. D. Baenziger.
E. M. Brown.
Inventor
Julius C. Newman.
By Edward N. Pagelsen
Attorney

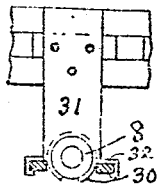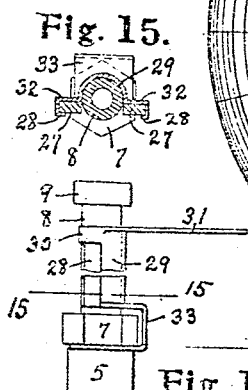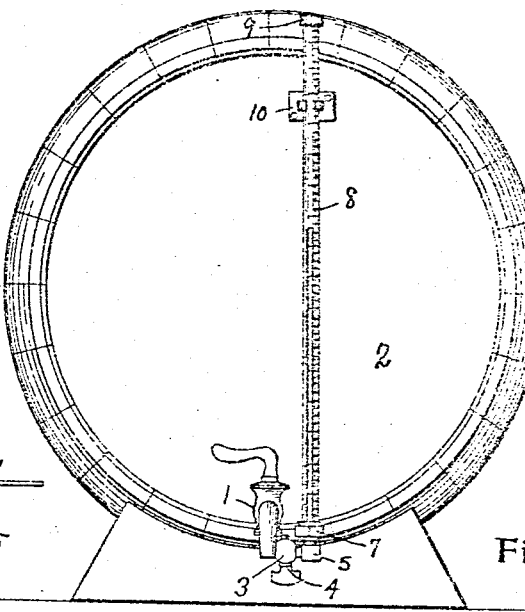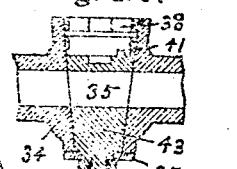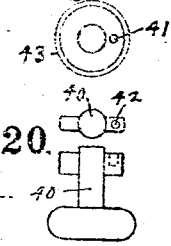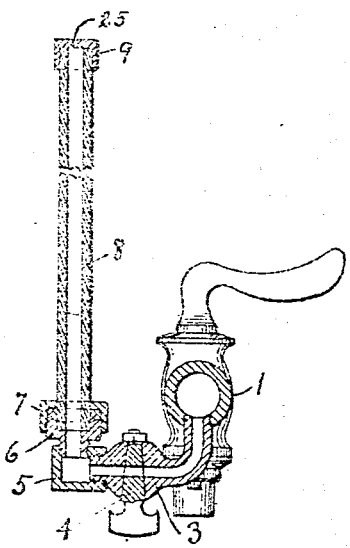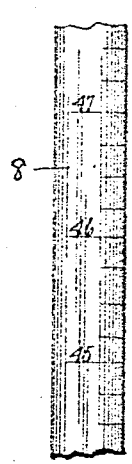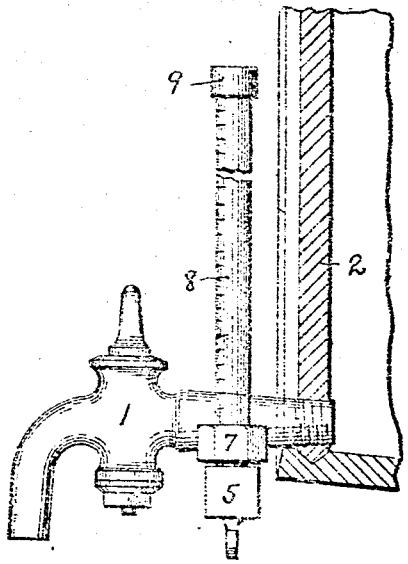

UNITED STATES PATENT OFFICE.

JULIUS C. NEWMAN, OF DETROIT, MICHIGAN ASSIGNOR TO NATIONAL LIQUID REGISTER COMPANY, A CORPORATION OF ARIZONA TERRITORY.

CASK-FAUCET GAGE.

977,216.

Specification of Letters Patent.    Patented Nov. 29, 1910.

Application filed November 23, 1908. Serial No. 464,145.

*To all whom it may concern:*

Be it known that I, JULIUS C. NEWMAN, a citizen of the United States, and a resident of Detroit, in the county of Wayne and State of Michigan, have invented a new and useful Cask-Faucet Gage, of which the following is a specification.

My invention relates to means for determining the amount of liquid contents of barrels, casks and other containers and its object is to provide an indicating device whereby the contents of a container will be readily known.

My invention consists in a vertical glass tube and a graduated scale marked thereon or adjacent thereto, together with means wherethrough the contents of a container may flow into this vertical glass tube and through which the contents of the container may be drawn off.

In the accompanying drawings, Figure 1 is an elevation of a cask and with one form of my gage in position. Fig. 2 is a vertical transverse cross section of the gage and the connection to a faucet. Fig. 3 is a side elevation of a faucet and gage. Fig. 4 is a small section of the glass tube graduated to correspond to the amount of the contents. Fig. 5 is a side elevation of my improved indicator with a modified form of scale. Figs. 6 and 7 are cross sections of the same taken on the lines 6—6 and 7—7 respectively. Fig. 8 is an elevation of the indicator and another form of the gage. Fig. 9 is a cross section on the line 9—9 of Fig. 8. Fig. 10 is a view of the securing plate. Figs. 11 to 20 inclusive are details of various parts.

Similar reference characters refer to like parts throughout the several views.

In the accompanying drawings 1 is the body of a faucet of any desirable type which screws into the head 2 of a container, such as a cask or barrel. A connection 3 provided with a valve or cock 4, screws into the body 1 of the faucet at any desirable point but preferably in the bottom. A right angle connection 5 receives the stuffing box 6 on which is mounted the gland 7. Between the stuffing box and gland is the usual packing and into both the gland and stuffing box is secured a glass tube 8 which has a cap 9. If desired, this tube may be graduated as shown in Fig. 4. To hold the tube in position and to keep it from being broken a bracket brace 10 is secured to the head of the container and is provided with arms to embrace the tube. As will be seen in Fig. 2 the level of the liquid in the container can always be seen until the level is below the bore of the intake end of the faucet.

When a cask is to be tapped the tube 8 is disconnected from the remainder of the apparatus and the faucet is screwed into the bung-hole in the head. The tube is then replaced and the gland 7 is screwed down to make a tight fit. The brace 10 may then be secured in position. The stop cock 4 is then opened and the level of the contents of the barrel will be indicated by the height of the liquid in the tube 8. If properly graduated this tube will indicate the amount of liquid in the container. By noting the level of the liquid in connection with the graduations on the tube, abstraction of the contents can be easily detected and measured. By these means the theft of contents of casks by employees is very easily determined.

Instead of graduating the glass tube 8, it may be desirable to secure a graduated scale adjacent thereto. As shown in Fig. 5 a small plate 12 may be secured between the stuffing box 6 and the elbow 5, which plate has a socket 13 into which the lower end of the scale 14 may fit.

Secured to the outer wall of staves 15 of the container is a plate 16 having a slot to receive the upper end of the scale 14 and continues beyond this to receive the tube 8, which may be slidable vertically between the jaws 17, and is prevented from trembling or swinging by said plate. With this construction a glass tube 8, long enough for the largest diameter, may be used and separate scales 14 for the different sizes of the containers may be supplied. It will be noticed that the scales 14 will be graduated for every different size of cask or container.

Instead of plate 12 extending toward the rear it may extend laterally as in Fig. 8 and have a round socket 19 to receive the rounded end of the polygonal scale 20. This scale may be either square in cross section as shown in Fig. 9, triangular as shown in Fig. 11, hexagonal as shown in Fig. 12 or even if desired the scale rod may be round as in Fig. 13. Any desirable number of series of graduations may be placed on the scale rods so that any rod may be adaptable for a number of different sizes of containers. The upper round end 21 of the rod fits into a sleeve 22 carried by a plate 23 which can also be secured to the outside of the container as shown in Fig. 8. This plate is provided with jaws 24 between which is slidable the glass tube 8.

To permit free movement of the liquid in the glass tube the cap 9 is provided with the vent 25. When the glass tube is properly graduated or is provided with a correctly graduated scale this mechanism may be employed for measuring the amounts of liquid drawn from casks or other containers. It will be noticed that with this construction only the usual bung-hole is required. By simply supplying new scales 14 this apparatus becomes applicable to every type of container in which the contents are of no higher level than the top of the glass tube. Any desirable metal may be employed for the fittings, and the scales may be formed of wood with printed paper or metal strips secured thereto, of graduated wood strips or of metal or other materials as may be desired.

Another form of indicator is shown in Figs. 14, 15 and 16. The scales are two narrow strips 27 of any desirable material, held in place by the jaws 28 of the trough shaped plate 29. The lower end 33 of this plate is flat and is bent around the gland 7 and is secured between the connection 5 and the gland. The upper end of the trough is formed with jaws 30 to hold the glass tube in position. A plate 31 extends to the cask.

In Figs. 17 to 20 inclusive are shown a valve and key to replace this valve in the connection 3 in Fig. 2. The body 34 is the same as before. The tapering valve 43 has a passage 35 and a nut 36 and washer 37 to hold it in position. A washer 38 is secured in the upper end of the bore of the body and has a slot 39 to admit the key 40. The valve has a round socket to receive the key and a pin 41 to fit the socket 42 in the key, whereby the valve may be turned. Any other form may be given the key and socket. The position of the slot 39 in the washer 38 determines the position of the passage 35 when the key is withdrawn. Any other desirable key operated valve may be employed.

Having now explained my improvements, what I claim as my invention and desire to secure by Letters Patent is:—

In a container gage, the combination of a faucet, a connection screwing into the body of the faucet, a valve in said connection, an elbow at the free end of the connection, a stuffing box mounted on said elbow, a vertical glass tube resting in the stuffing box, a plate secured between the stuffing box and elbow, a graduated scale mounted on the plate and extending parallel to the tube, and means for bracing the upper end of the tube and scale.

In testimony whereof, I have signed this specification in the presence of two subscribing witnesses.

JULIUS C. NEWMAN.

Witnesses:
EDWARD N. PAGELSEN,
ELIZABETH M. BROWN.